(12) United States Patent
Huang

(10) Patent No.: US 6,840,871 B2
(45) Date of Patent: Jan. 11, 2005

(54) COMPOSITE GRIP FOR GOLF CLUBS

(76) Inventor: Ben Huang, 19472 Woodlands La., Huntington Beach, CA (US) 92648

( * ) Notice: Subject to any disclaimer, the term of this patent is extended or adjusted under 35 U.S.C. 154(b) by 0 days.

(21) Appl. No.: 10/695,523

(22) Filed: Oct. 28, 2003

(65) Prior Publication Data

US 2004/0087386 A1 May 6, 2004

Related U.S. Application Data

(60) Division of application No. 10/107,502, filed on Mar. 27, 2002, now Pat. No. 6,676,534, and a continuation-in-part of application No. 10/077,097, filed on Feb. 15, 2002, now Pat. No. 6,641,488, and a continuation-in-part of application No. 09/909,347, filed on Jul. 18, 2001, now Pat. No. 6,629,901, and a continuation-in-part of application No. 09/705,376, filed on Oct. 30, 2000, now abandoned.

(51) Int. Cl.$^7$ .............................................. A63B 53/14
(52) U.S. Cl. .................................... 473/302; 427/393.4
(58) Field of Search ............................... 473/300–303; 427/393.4, 356; 428/327, 147, 423.9

(56) References Cited

U.S. PATENT DOCUMENTS

| | | |
|---|---|---|
| 621,993 A | 3/1899 | Crosier |
| 1,017,565 A | 2/1912 | Lard |
| 1,655,791 A | 1/1928 | Novak |
| 2,513,655 A | 7/1950 | Lamkin et al. |
| 2,941,806 A | 6/1960 | Stevens |
| 3,028,283 A | 4/1962 | Lundgren et al. |
| 3,070,370 A | 12/1962 | Steiner |
| 3,252,706 A | 5/1966 | Rosasco, Sr. |
| 3,311,375 A | 3/1967 | Onions |
| 3,524,646 A | 8/1970 | Wheeler |
| 4,053,676 A * | 10/1977 | Kaminstein ............... 428/313.5 |
| 4,250,135 A * | 2/1981 | Orsini ......................... 264/227 |
| 5,055,340 A * | 10/1991 | Matsumura et al. ......... 428/172 |
| 5,145,171 A | 9/1992 | Head et al. |
| 5,275,407 A * | 1/1994 | Soong ......................... 473/549 |
| 5,478,074 A | 12/1995 | Storper |
| 5,513,845 A | 5/1996 | Sonagere |
| 5,620,180 A | 4/1997 | Hong |
| 5,626,527 A | 5/1997 | Eberlein |
| 5,645,501 A * | 7/1997 | Huang ........................ 473/549 |
| 5,653,643 A * | 8/1997 | Falone et al. ............... 473/300 |
| 5,695,418 A | 12/1997 | Huang |
| 5,730,662 A | 3/1998 | Rens |
| 5,797,813 A * | 8/1998 | Huang ........................ 473/549 |
| 5,851,632 A * | 12/1998 | Chen et al. .................. 428/156 |
| 5,857,929 A * | 1/1999 | Huang ........................ 473/549 |
| 5,924,941 A * | 7/1999 | Hagey ........................ 473/551 |
| 6,629,901 B2 * | 10/2003 | Huang ........................ 473/549 |
| 6,641,488 B2 * | 11/2003 | Huang ........................ 473/302 |

FOREIGN PATENT DOCUMENTS

| | | | |
|---|---|---|---|
| JP | 2-69228 | * 3/1990 | |
| JP | 40206922 A | * 3/1990 | ............. 428/318.6 |
| JP | 402069228 A | 3/1990 | |

OTHER PUBLICATIONS

PCT/DE92/00678.*

* cited by examiner

Primary Examiner—Stephen Blau
(74) Attorney, Agent, or Firm—Knobbe Martens Olson & Bear LLP

(57) ABSTRACT

A golf club grip made up of a composite strip that includes a first segment having a felt layer to the upper surface of which is bonded a polyurethane that is embossed with a friction enhancing pattern and a second segment having a felt layer to the upper surface of which is bonded a layer of polyurethane. Decorative indicia are embossed on the upper surface area of the polyurethane layer of the second segment. When the strip is spirally wrapped about a resilient underlisting sleeve or directly about the handle of a golf club the embossed friction enhancing pattern cooperates with the decorative indicia to increase the hoop strength of the strip reducing the tendency of the strip to unravel.

14 Claims, 8 Drawing Sheets

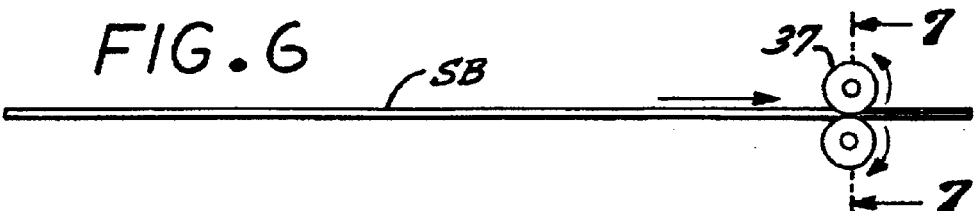
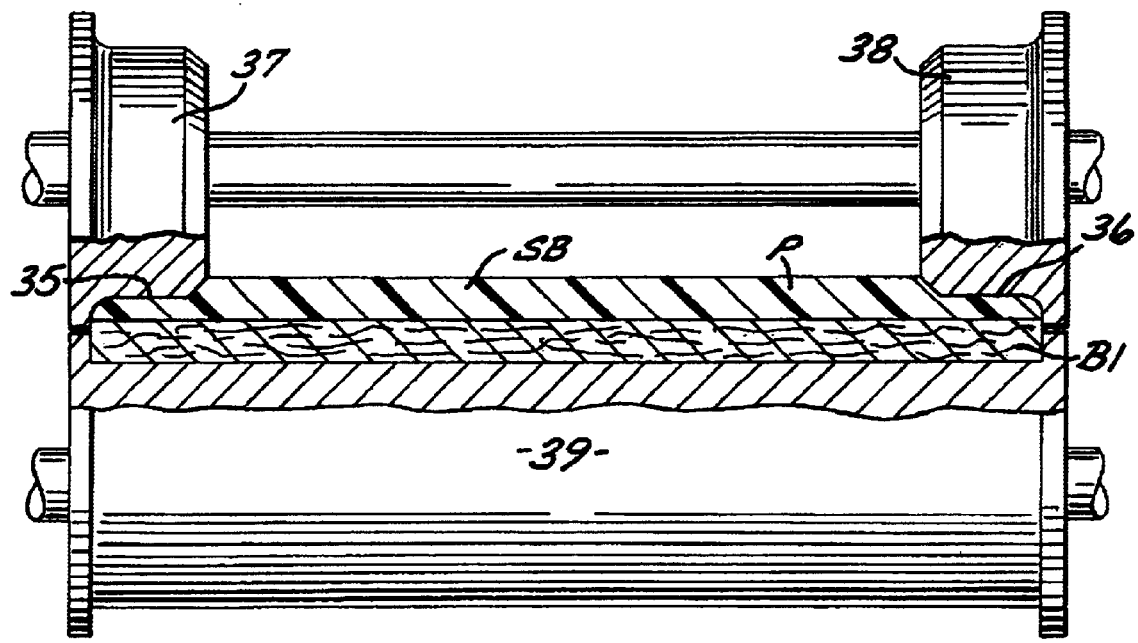
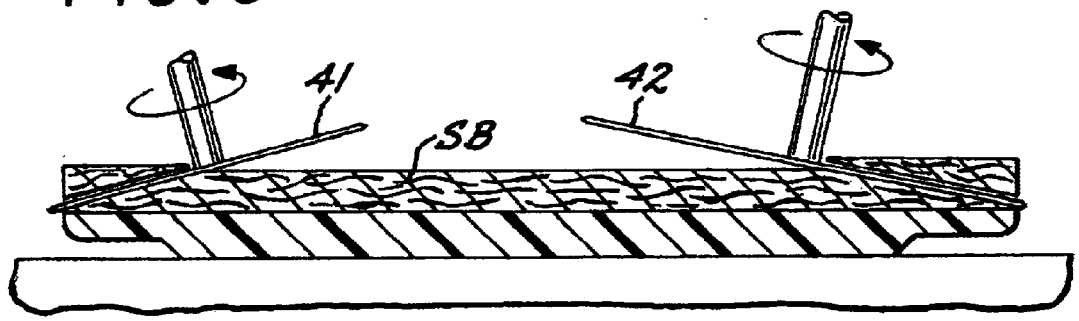

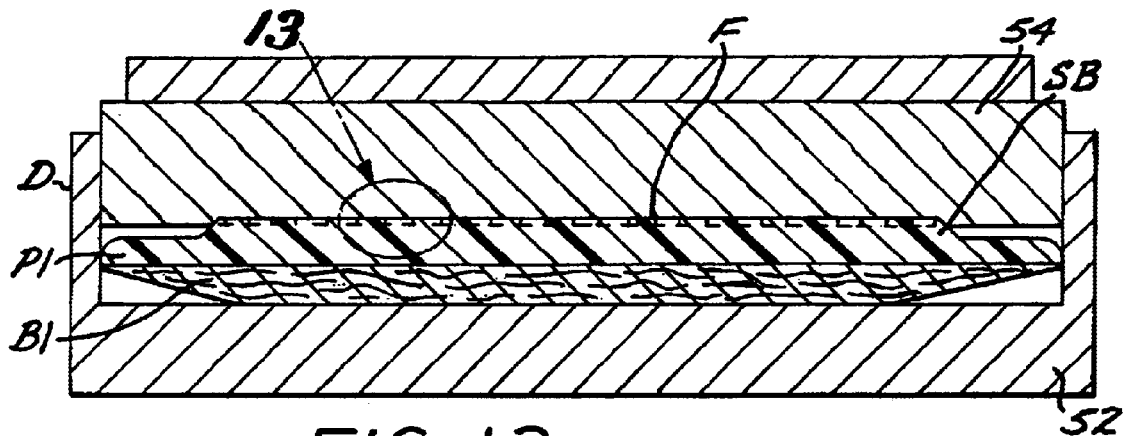
FIG.12
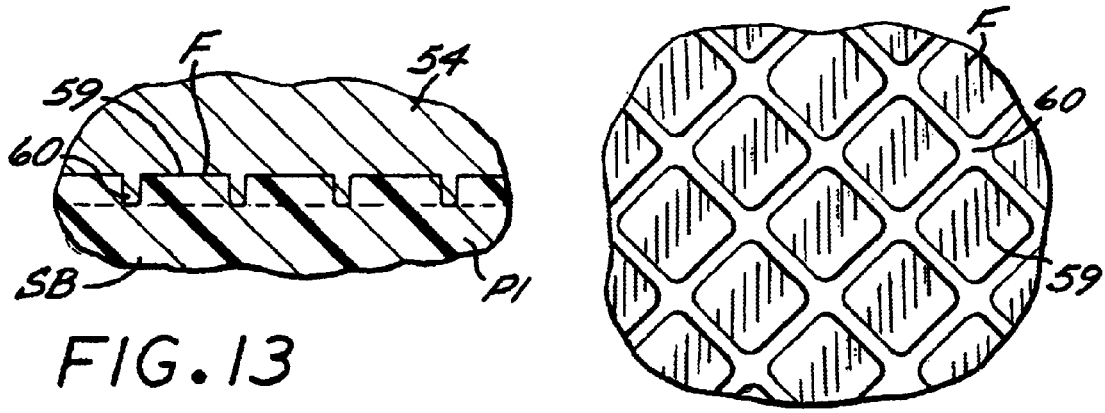
FIG.13
FIG.14
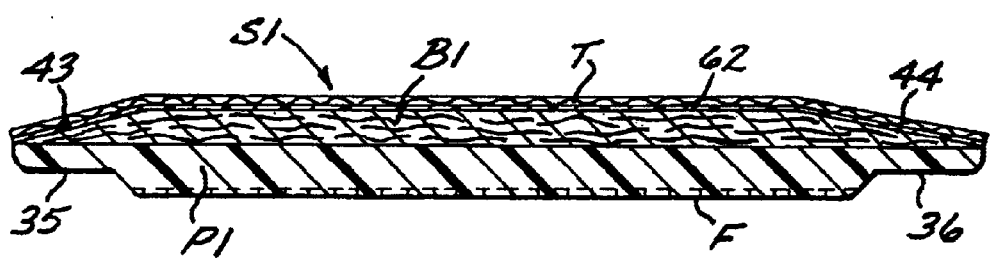
FIG.15

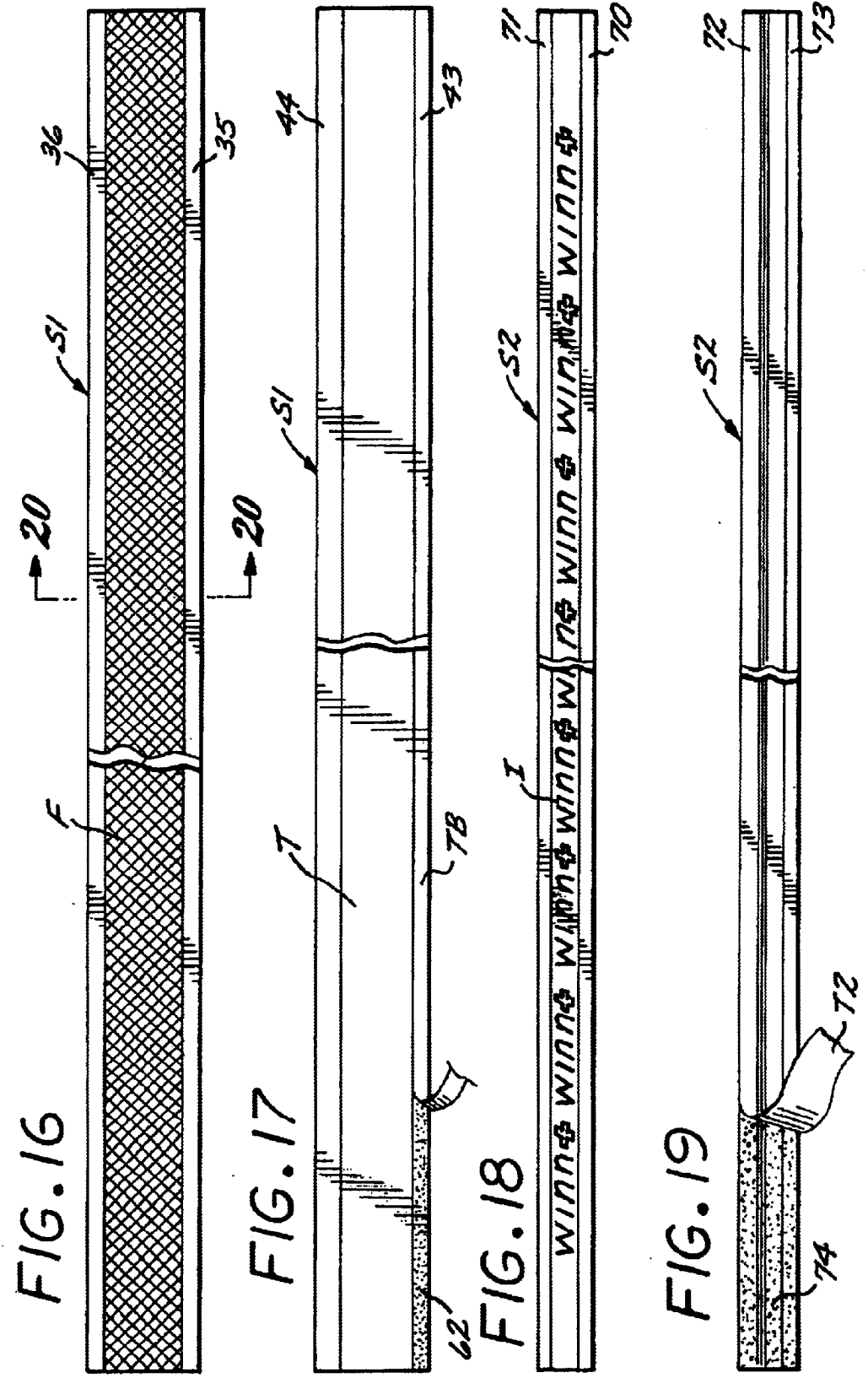

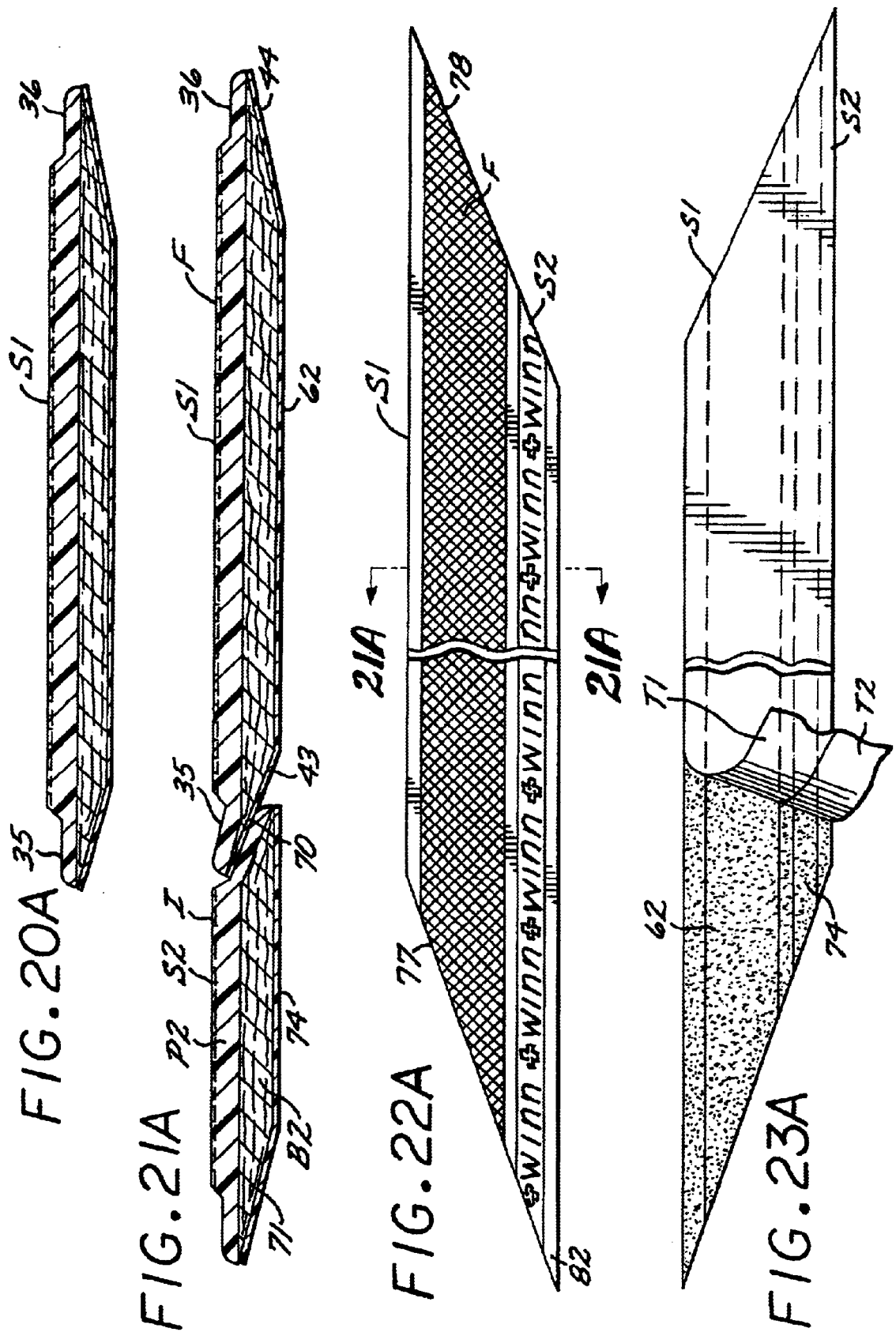

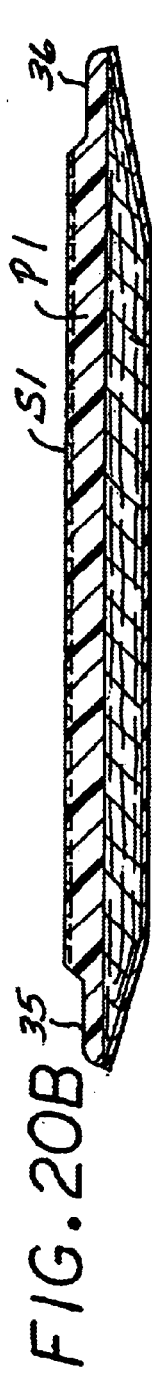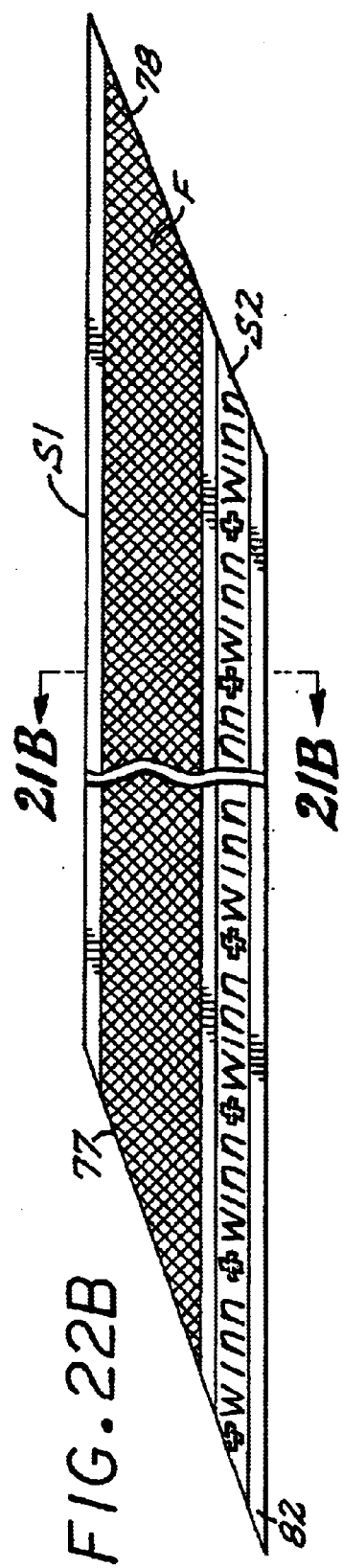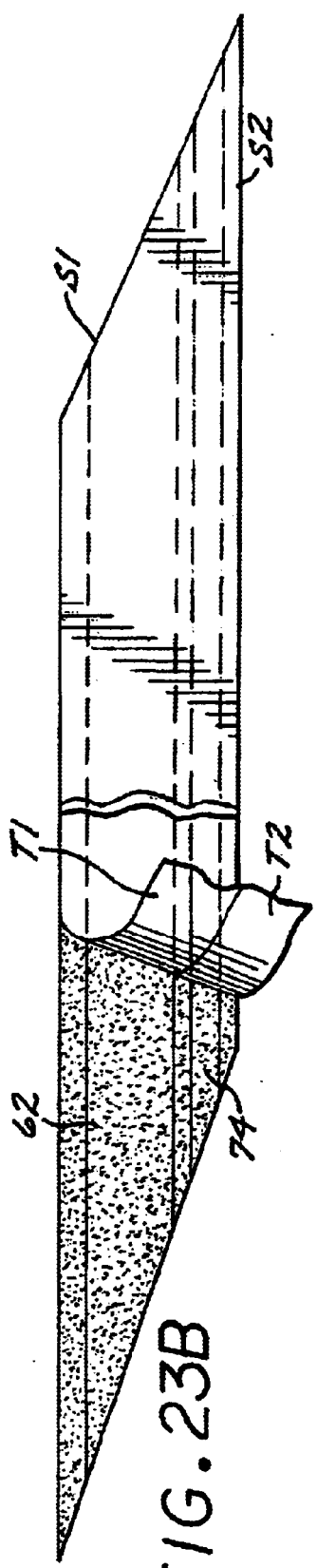

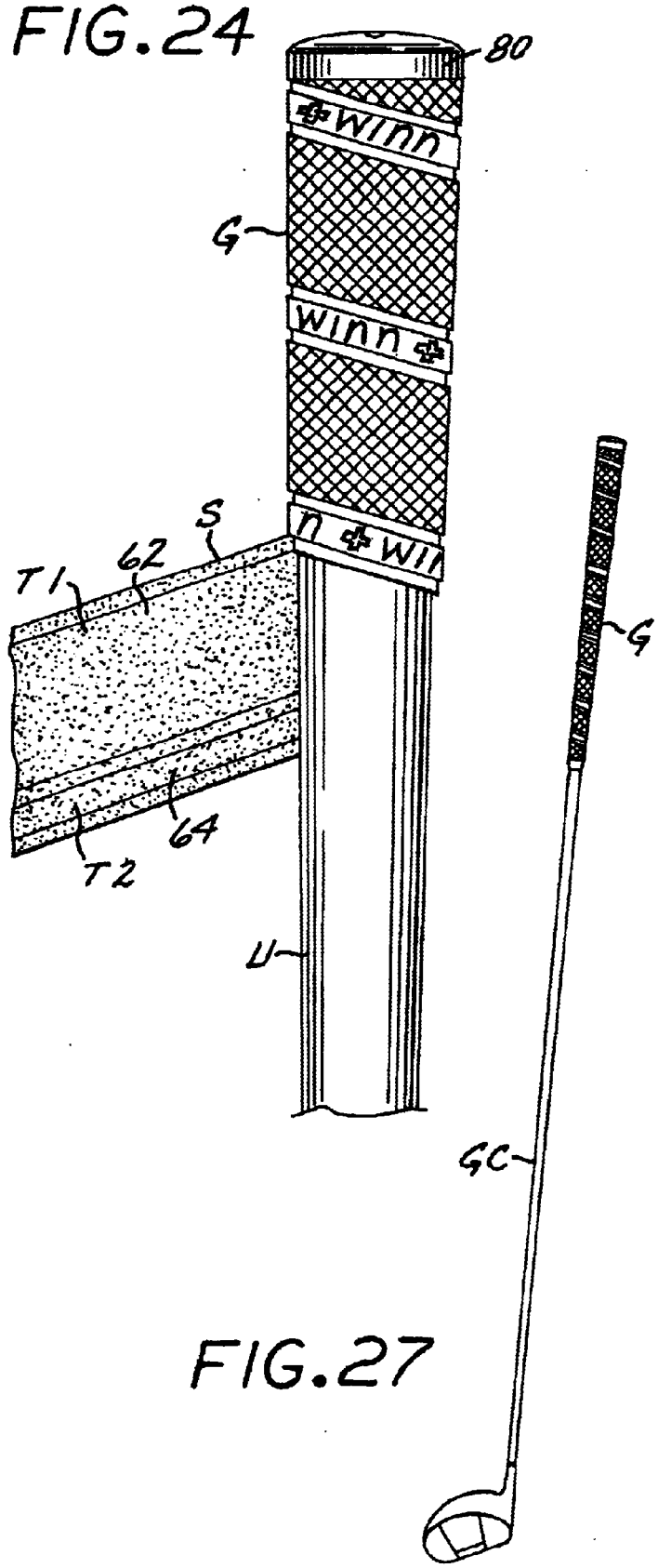
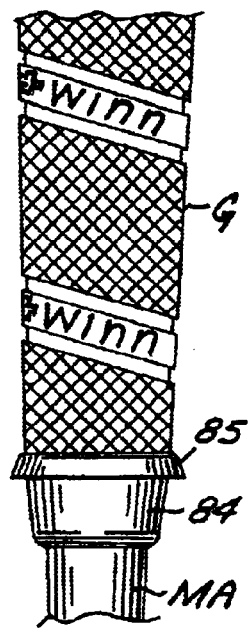
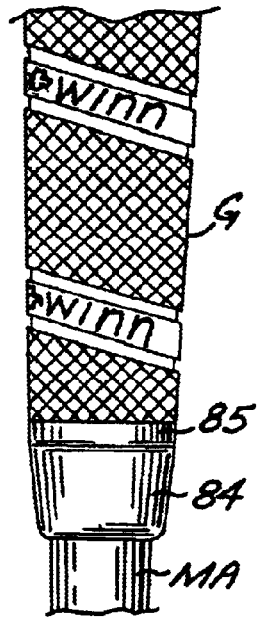

COMPOSITE GRIP FOR GOLF CLUBS

RELATED U.S. APPLICATION DATA

This application is a divisional of U.S. patent application Ser. No. 10/107,502 filed by me on Mar. 27, 2002, now U.S. Pat. No. 6,676,534, a continuation in part of U.S. patent application Ser. No. 09/909,347 filed by me on Jul. 18, 2001, now U.S. Pat. No. 6,629,901, a continuation in part of U.S. patent application Ser. No. 09/705,376 filed by me an Oct. 30, 2000, now abandoned, and a continuation in part of U.S. patent application Ser. No. 10/077,097, filed by me on Feb. 15, 2002, now U.S. Pat. No. 6,641,488.

BACKGROUND OF THE INVENTION

The present invention relates to an improved golf club grip.

Applicant has previously developed resilient grips which successfully reduce shock to the muscle and arm joints of the users of golf clubs, tennis racquets, racquet ball racquets, baseball bats and other impact imparting devices. See, for example, U.S. Pat. No. 5,797,813 granted to applicant Aug. 25, 1998. Such earlier grips utilize a polyurethane layer bonded to a felt layer to define a strip which is spirally wrapped around the handle of a golf club, racquet or the like to conform to the external configuration or such handle. In certain of such grips the sides of the felt layer taper from the side edges of the strip and the polyurethane layer is formed with recessed reinforcement side edges which overlap to form a water retarding joint between the side edges of the strip as the strip is wrapped around the handle or over a resilient sleeve telescopically carried by the golf club handle. A problem common to polyurethane-felt golf club grips is the tendency of the side edges of the polyurethane-felt grips to unravel over a period of use from stretching of the strip as well as by frictional contact of the exterior of the grip with a golf bag as a golf club is removed from and returned into such golf bag.

Another problem is that such grips are prone to absorbing water. Accordingly, the grip will tend to absorb the perspiration from the user's hand and may become saturated during play thereby causing slippage of the golf club in the user's hands. The same problem occurs under wet conditions such as when playing golf in the rain. The golfer then either stops playing, or alternatively continues his game with reduced pleasure because of slippage of the grip in his hands.

SUMMARY OF THE INVENTION

Applicant has developed an improved shock resistant golf club grip utilizing a polyurethane-felt strip made up of two segments. Each segment is preferably of a different width. The upper surface of the narrower segment may be embossed with indicia so as to densify such segment and enhance the strength of such segment to thereby provide increased resistance against the edges of the segments being loosened from a golf club. The upper surface of the wider segment may be embossed with a friction enhancing pattern engaged by a golfer's hands. Such embossing densifies the wider segment to further increase resistance against the strip being loosened from a golf club. The two segments may be of different colors so as to provide a golf club grip of a unique decorative appearance.

Additionally, the use of friction enhancing pattern of the wider strip results provides an all-weather grip which may be used under both wet and dry playing conditions with equally good results. Accordingly, in the event of rain the golfer can continue to play without slippage of the grip within the golfer's hands.

The two-piece strip of the present invention may be spirally wrapped about a tapered resilient underlisting sleeve, with such sleeve being slipped onto the handle of a golf club shaft. Alternatively, the strip may be directly spirally wrapped about the handle of a golf club, tennis racquet or the like. When the two-piece strip is spirally wrapped about an underlisting sleeve, the sleeve may be positioned on a collapsible mandrel to provide a slip-on golf club grip that can be applied to a new golf club or can be utilized as a replacement golf club grip.

BRIEF DESCRIPTION OF THE DRAWINGS

FIG. 5 is a vertical sectional view taken in enlarged scale along lines 5—5 of FIG. 4;

FIG. 6 is a reduced vertical sectional view showing heat recessed reinforcement side edges being formed in the polyurethane layer of the wider segment strip blank of FIG. 5;

FIG. 7 is a vertical sectional view taken in enlarged scale along line 7—7 of FIG. 6;

FIG. 8 is a vertical sectional view showing the side edges of the wider segment strip blank of FIG. 7 being skived to define slanted side edges in such blank;

FIG. 12 is a vertical sectional view taken in enlarged scale along line 12—12 of FIG. 10;

FIG. 13 is an enlarged side view of the encircled area 13 in FIG. 12;

FIG. 14 is an enlarged top view of the encircled area 14 in FIG. 11;

FIG. 15 is a vertical sectional view of a finished wider segment strip;

FIG. 16 is a broken top plan view of the heat embossed upper surface of the wider segment strip of FIG. 15 which has been heat embossed to define a friction enhancing pattern;

FIG. 17 is a broken bottom view showing a peel-off adhesive tape being removed from the underside of the wider segment strip of FIG. 16;

FIG. 18 is a broken top plan view of a narrower polyurethane-felt strip segment of a golf club grip embodying the present invention;

FIG. 19 is a broken bottom view of the narrower segment of FIG. 18;

FIGS. 20A and 20B are vertical sectional views of different embodiments of the wider segment taken in enlarged scale along line 20—20 of FIG. 16;

FIGS. 21A and 21B are vertical sectional views of the composite strip taken in enlarged scale along line 21—21 of FIGS. 22A and 22B, respectively;

FIGS. 22A and 22B are broken top views of different embodiments of the composite strip;

FIGS. 23A and 23B are broken bottom views of the embodiments of FIGS. 22A and 22B, respectively, showing a peel-off tape being removed from the underside of the composite strip;

FIG. 24 is a broken side elevational view showing a composite strip embodying the present invention being wrapped around an underlisting sleeve to form a golf club grip;

FIGS. 25 and 26 are broken side elevational views showing the lower end of the composite strip of FIG. 24 being secured to the lower portion of the underlisting sleeve; and FIG. 27 is a perspective view showing a golf club grip embodying the present invention applied to the handle of a golf club.

DETAILED DESCRIPTION OF PREFERRED EMBODIMENT

Figure 1:
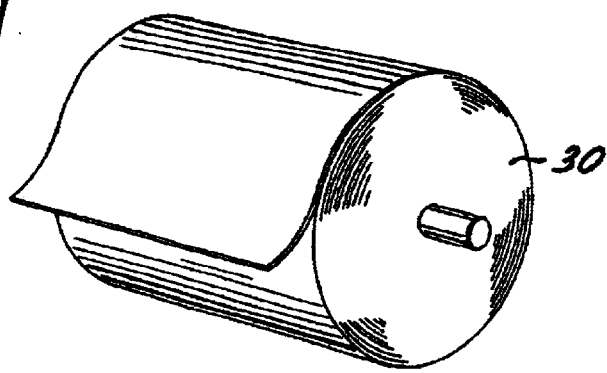
FIG. 1 is perspective view of a roll of polyurethane-felt material utilized in making the wider segment of a grip embodying the present invention.

Referring to the drawings, a preferred form of grip G embodying the present invention utilizes an elongated composite two-piece strip S which is spirally wrapped around a resilient underlisting sleeve U which is slipped onto the handle of a golf club GC as shown in FIGS. 24–27. Such strip may also be applied to the handle of other imparting devices (not shown) such as a tennis racquet.

More particularly, strip S is fabricated from first and second individual segments S1 and S2 of different widths, with segment S1 preferably being wider than segment S2. Segment S1 includes a polyurethane layer P1 and a backing layer B1, preferably of felt. The underside of the backing layer B1 is originally covered with a conventional double adhesive-sided peel-off tape T. All or substantially all of the upper surface of polyurethane layer P1 is heat embossed with a friction enhancing pattern F engaged by a golfer's hands by means of a method described hereinafter.

More particularly, referring to FIGS. 1–15 there is shown a preferred method of making the wider segment S1 from a roll 30 of polyurethane-felt material. The felt layer B1 is formed of a suitable open-pored material such as nylon, cotton, wool or the like, and has its upper or outer surface bonded to the lower surface of the polyurethane layer P1. The polyurethane layer P1 is formed with pores (not shown) which extend vertically, i.e., generally normal to the longitudinal axis of the strip S and racquet handle or golf club handle when the grip has been affixed to such handle. The polyurethane layer P1 may be formed in a conventional manner by coating one side of a felt strip with a solution of polyurethane (e.g., polyester or polyether) dissolved in a dimethyl formamide (DMF), immersing the coated strip in water baths to displace the DMF and cause the urethanes to coagulate, and finally driving off the water by the application of pressure and heat. In this manner, the pores will extend perpendicularly relative to the longitudinal axis of the strip, while the underside of the polyurethane layer P1 is bonded to the upper surface of the felt strip. Other materials may be substituted for felt as a backing layer B1 to provide strength for polyurethane layer P1, e.g., a synthetic plastic such as an ethylene-vinyl acetate copolymer, commonly known as EVA.

Figure 2:
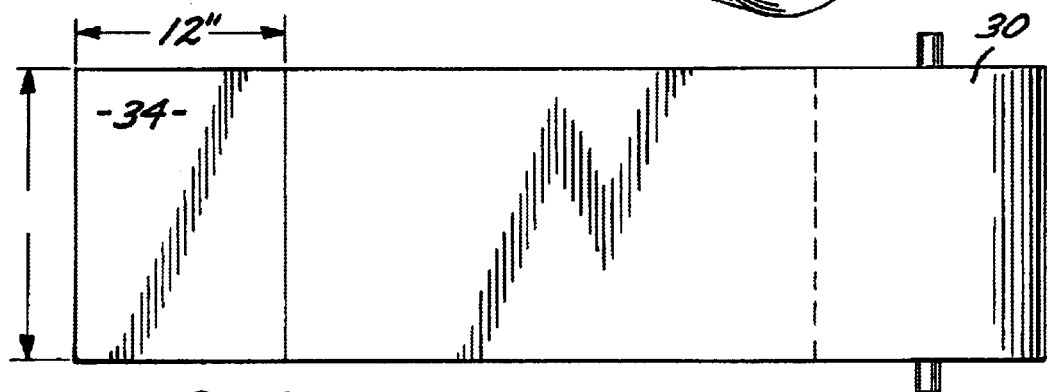
FIG. 2 is a top plan view showing the roll of FIG. 1 being dimensioned into a panel.
Figure 3:
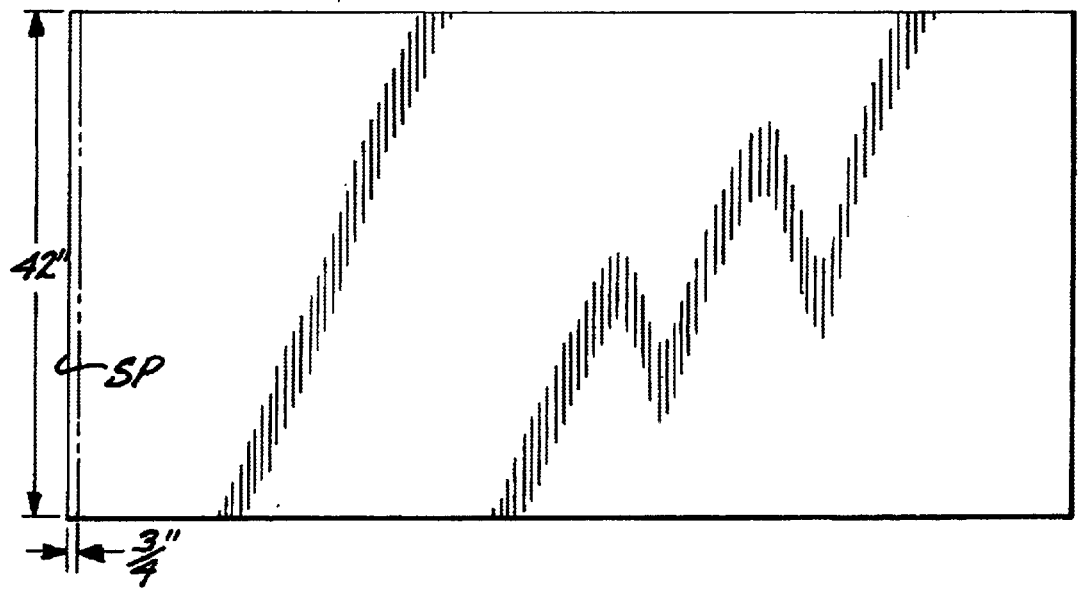
FIG. 3 is a top plan view showing a portion of the panel of FIG. 2 dimensioned for cutting therefrom a plurality of wider segment strip blanks in accordance with the present invention.
Figure 4:
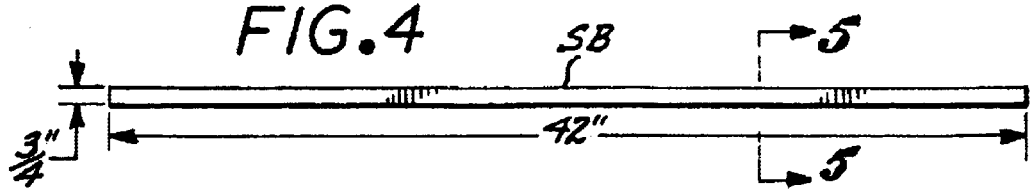
FIG. 4 is a top plan view of a wider segment strip blank cut from the panel of FIG. 3.
Figure 9:
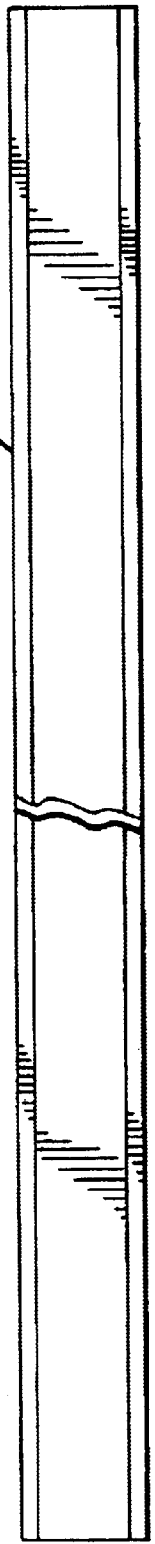
FIG. 9 is a top plan view of a wider segment strip blank before its upper surface is heat embossed with a friction enhancing pattern.

Referring now to FIGS. 1–5, there is shown an arrangement for cutting a blank SB from roll 30 from which is formed a wider segment S1 or strip S. In FIG. 2, a panel 34 of the polyurethane-felt material is cut from roll 30. By way of example the width of such panel can be 42 inches, and the length 12 inches. A plurality of wider segment blanks SB can be cut from the panel 34 as shown in FIGS. 3 and 4, with each such strip having a width of ¾ inch by way of example. A resulting blank SB is shown in FIGS. 4 and 5. In FIGS. 6 and 7 the sides of the polyurethane layer P1 of the blank are shown being formed with recessed reinforcement edges 35 and 36 as by means of heated rollers 37, 38, and 39 such as shown in my U.S. Pat. No. 6,203,308. In FIG. 8, the sides of the felt layer B are shown being skived as by rotating knives 41 and 42 in a conventional manner so as to define the slanted side edges 43 and 44 of a completed wider segment S1 of composite strip S.

Figure 10:
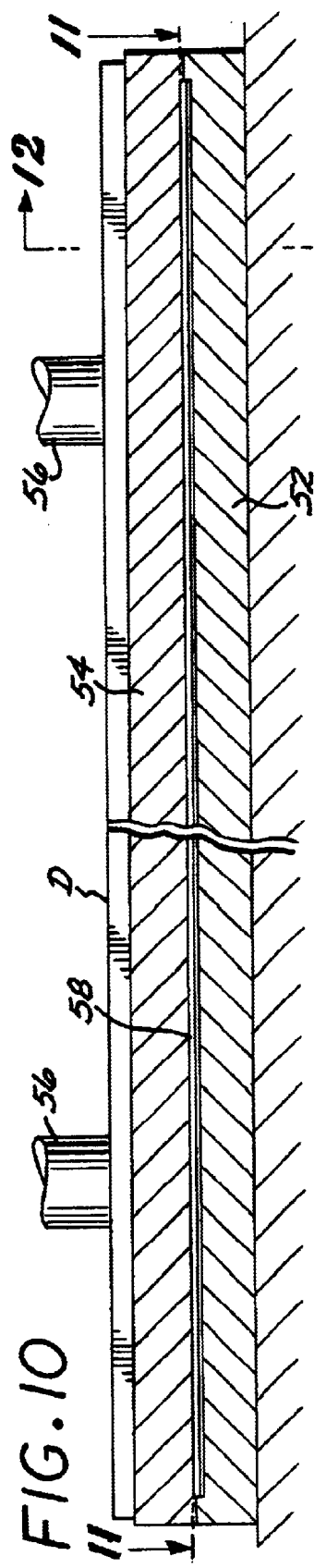
FIG. 10 is a vertical sectional view of a die used to heat emboss the upper surface of the wider segment strip blank with a friction enhancing pattern.
Figure 11:
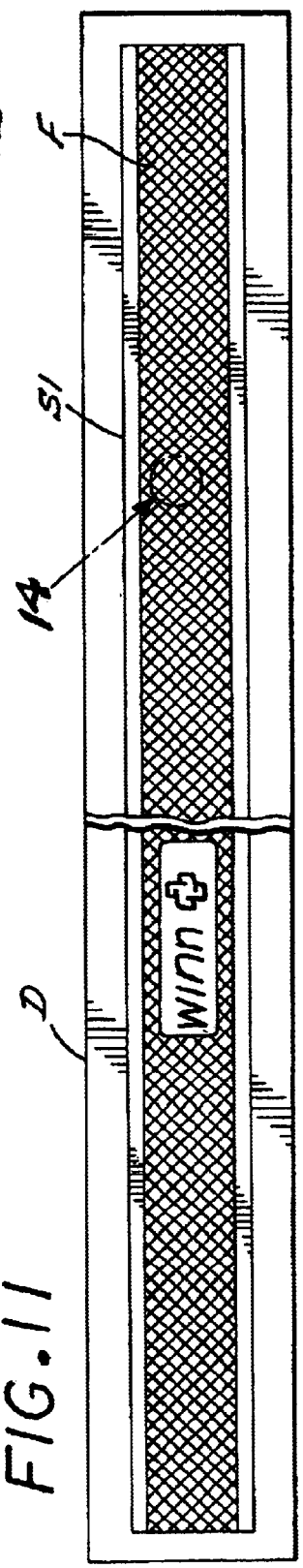
FIG. 11 is a horizontal sectional view taken along line 11—11 of FIG. 10

Referring now to FIGS. 10–12, there is shown a heated steel die D utilized to form a friction enhancing pattern F on the upper surface of the wider segment blank SB. Die D includes a bottom half 52 and a complementary upper half 54. Upper die half 54 is vertically movable relative to the lower die half by power-operated plungers 56 in a conventional manner. The underside of upper die half 54 is engraved to define friction enhancing pattern F. A cavity 58 is formed between the upper and bottom die halves to removably receive a wider segment blank SB that is to be formed with pattern F. With blank SB disposed in the cavity, upper die-half 54 is urged downwardly into the polyurethane layer P1 so as to partially permanently depress such layer and concurrently heat emboss pattern F upon the upper surface of such layer. Such heat embossing increases the density of the polyurethane layer with a resulting increase in the strength of this layer. The magnitude of density increase is generally proportional to the thickness of the strip S. By way of example, where the strip thickness is 1.8 mm, the felt layer can be 1.4 mm as compared to a 0.4 mm polyurethane layer, and the polyurethane layer can be decreased in thickness 0.07–0.1 mm. Heat embossing the polyurethane layer P also renders such layer substantially water-tight. FIG. 16 shows the upper surface of the wider segment S1 embossed with friction enhancing pattern F.

Friction enhancing pattern F includes a large number of small repetitive shapes 59, such as squares or diamonds, with the interstices 60 of these shapes cooperating to collect water that may accumulate on the outer surface of the wider segment. When a grip G utilizing the wider segment S1 is wetted, as by rain, water collected in these interstices 60 can be readily removed by wiping the grip with a towel (not shown). The grip is then immediately ready for continued play despite the rain. During dry playing conditions, friction enhancing pattern F resists slippage between grip G and a golfer's hands.

Referring now to FIG. 17, the entire underside of backing layer B1 of wider segment S1 is provided with an adhesive 62 initially covered in a conventional manner by a peel-away tape T. Peel-away tape T includes a score line 63 over skived edge 43 which defines a thin band TB which can be pulled off the main body of tape T to expose adhesive 62 disposed on one edge of wider segment S1, while the tapes' main body remains on the adhesive covering the remainder of the wider segment S1.

Narrower segment S2 includes an open-pored bottom backing layer, generally designated B2, (preferably of felt), having an inner or bottom surface which is adhered to underlisting sleeve U. Segment S2 also includes a top layer P2 of a suitable resilient plastic material such as polyurethane, with the polyurethane layer being bonded to the upper surface of its adjacent backing layer B2. The polyurethane layer of strip segment S2 may be formed in a conventional manner by coating a felt strip with one or more solutions of polyurethane (e.g., polyester or polyether) dissolved in a dimethyl formamide (DMF), immersing the coated strip in water baths to displace the DMF and cause the urethane to coagulate, and finally driving off the water by the application of pressure and heat. In this manner, pores are formed (not shown), while the underside of the polyurethane layer is bonded to the upper surface of the felt layer. The thickness of the polyurethane layer is preferably about 0.2–1.40 millimeters and the thickness of the felt layer is about 0.7–1.90 millimeters.

The felt layer B2 serves as a backing layer for the polyurethane layer P2 and so as to provide strength for the polyurethane. The felt also cooperates with the polyurethane to assist in cushioning the shocks applied to a grip when a golf ball is struck by a golf club. It should be noted that other materials may be substituted for the felt as a backing layer to provide strength for the polyurethane and to cushion shocks, e.g., a synthetic plastic such as an ethylene-vinyl acetate copolymer, commonly known as EVA. The felt may be fabricated of conventional suitable materials such as nylon, cotton, polyester or the like.

Referring now to FIG. 21A, the side edges of the polyurethane layer P2 of segment S2 are formed with sidewardly and outwardly extending reinforcement side edges 70 and 71. The side edges of the felt layer B2 of segment S2 have been skived to form outwardly and upwardly slanted side edges 72 and 73. The underside of segment S2 is covered with an adhesive 74 initially covered by a peel-away tape T2. To combine segments S1 and S2 into composite strip S, the band TB of peel-away tape T is pulled off segment S1 as shown in FIG. 17. A skived side edge 43 of segment S1 is then placed on top of reinforced side edge 70 of segment S2, as shown in FIG. 21A and pressed onto segment S2. The strip S is then cut on both ends to provide the leading edge and trailing edges 77 and 78, as shown in FIGS. 22A and 23A. FIGS. 20B–23B show alternative embodiments that are similar in many respects to FIGS. 20A–23A. In particular, FIG. 20B shows an embodiment of the wider segment S1 with an EVA backing layer B1 and no pattern F on its polyurethane layer P1. FIG. 21B shows the composite strip S with EVA backing layers B1, B2 of segments S1, S2, respectively, and no pattern F or indicia I on the polyurethane layers P1, P2, respectively. FIGS. 22B and 23B depict embodiments with EVA backing layers B1, B2 and outer layers P1, P2 with the pattern F and indicia I, respectively.

It should be particularly noted that the upper area of polyurethane layer of segment S2 inwardly of the recessed side edges is embossed with depressed indicia I, such as the name of the manufacturer of the golf club grip. Such embossing serves not only as a decorative enhancement of the golf club grip, but additionally, the embossing process densifies the polyurethane layer P2 so as to reduce stretching of the second segment and thereby cooperates with strip S1 to increase the hoop strength of the composite strip S. It is also desirable to mold the polyurethane layer P1 of segment S1 in a first color while polyurethane layer P2 of segment S2 is molded in a second color that contrasts with the first color. With this arrangement, a multicolored grip having a pleasing appearance will result when the composite strip S is spirally wrapped about an underlisting sleeve.

Referring now to FIGS. 24–27, there is shown a resilient rubber-like underlisting U which can be utilized in forming a slip-on grip G of the present invention. Underlisting sleeve U is fabricated of a synthetic plastic foam or rubber utilizing an integral cap 80. Below the cap 80 there is formed a groove (not shown) to receive the starting end 82 of a completed composite strip S described hereinabove (FIG. 22). The lower end of the sleeve U is formed with an integral nipple 84. The upper portion of the nipple is provided with a resilient lip 85. To apply composite strip S to the underlisting sleeve U, the protective tapes T1 and T2 are peeled-off of the underside of strips S1 and S2 to expose adhesives 62 and 74. As the strip S is wrapped around the underlisting sleeve U, the underside of the skived side edges of the polyurethane layers P1 and P2 overlap the recessed side edges with such edges being secured together in a water-tight manner by the adhesives. When the lower edge of the composite strip S has been spirally wound to a position wherein its lower edge is disposed in horizontal alignment with the upper portion of the nipple 84, lip 85 is folded downwardly, and the lower portion of the strip is wrapped about the upper portion of the nipple. The lip 85 is then snapped back to its original position, and will securely retain the lower end of the composite strip S on the nipple to prevent unraveling of the strip and also provide a nicely finished appearance of the grip. It should be understood that the underlisting sleeve U may be disposed upon a conventional collapsible mandrel MA as the strip is wrapped therearound. After the strip and sleeve combination is removed from the mandrel MA such combination will define the aforedescribed strip G which is slipped over the handle of a golf club, as shown in FIG. 27.

The tight fit between the nipple lip 85 and the lower portion of the composite strip S enhances the resistance to unraveling of the side edges of the strip provided by the increased hoop strength obtained by embossing the upper surface of strip segments S1 and S2. Accordingly, a grip embodying the present invention will resist unraveling over an extended period of use by a golfer. Additionally, it should be understood that the golf club grip of the present invention provides an all weather grip which can resist twisting of a golf club handle relative to a golfer's hands under both wet and dry conditions. Under rainy conditions the grip can be maintained dry by merely wiping it off with a towel. Under dry conditions the friction generated between a golfer's hands and the repetitive shapes 59 of the friction enhancing pattern F resists twisting of a golf club handle without requiring the golfer to tightly grasp the grip. The densification of the polyurethane layers of strips S1 and S2 during the heat embossing thereof also strengthens the grip resulting in a light weight construction permitting a higher club-head speed with no loss of accuracy. Finally, the friction enhancing pattern F combined with the indicia I affords a distinctive appearance for the grip.

Various modifications can be made without departing from the spirit and scope of the present invention. By way of example, the golf club grip may be formed of a composite strip of more than two segments. Also, the segments may be of equal width. Accordingly, it is not intended that the invention be limited, except by the appended claims.

What is claimed is:

1. A golf club grip that includes an elongated composite strip, said strip comprising:
   a first segment paving a backing layer to the upper surface of which is bonded a layer of polyurethane, with the upper surface of the polyurethane being heat-embossed with a friction enhancing pattern engaged by a player's hands, the friction enhancing pattern defining water collection interstices, with water collected in the in the interstices being readily wiped off to dry the outside of the strip, the upper surface of the polyurethane layer being densified and rendered substantially water-tight by the heat embossing;

a second segment paving a backing layer to the upper surface of which is bonded a layer of polyurethane and with depressed decorative indicia being embossed on the upper surface area of such second segment to densify the polyurethane thereof;

adhesive on the underside of the backing layers of the first and second segments; and with a side edge of the first segment being adhesively attached along one of its side edges to a side edge of the second segment to define said composite strip.

2. A golf club grip as set forth in claim 1, wherein the friction enhancing pattern includes a large number of repetitive shapes which define the water collection interstices.

3. A golf club grip as set forth in claim 1, wherein the backing layers are felt.

4. A golf club grip as set forth in claim 1, wherein the backing layers include an EVA.

5. A golf club grip as set forth in claim 1, wherein the side edges of the polyurethane layers of the first and second segments are heat-compressed so as to define recessed reinforcement side edges and outwardly and downwardly slanted skived side edges are formed along the length of the backing layer of such segments.

6. A golf club grip as set forth in claim 5, wherein the adhesive of the backing layer of the first segment is initially covered by a peel-off tape that is scored along one side to define a band that covers a skived side edge of said backing layers, said band being removed for attachment to a recessed reinforcement side edge of the second segment.

7. A slip-on golf club grip comprising:

an elongated composite strip that includes a first segment having a backing layer to the upper surface of which is bonded a layer of polyurethane, with the upper surface of the polyurethane being heat-embossed with a friction enhancing pattern engaged by a player's hands, the friction enhancing pattern defining water collection interstices, with water-collected in the interstices being readily wiped off to dry the outside of the strip, the upper surface of the polyurethane layer being densified and rendered substantially water-tight by the heat embossing, and a second segment that includes a backing layer to the upper surface of which is bonded a coating of polyurethane, and with depressed decorative indicia being embossed on the upper surface area of such second segment to densify the polyurethane layer thereof;

adhesive on the underside of the backing layers;

with a side edge of the first segment being adhesively attached along its side edge to a side edge of the second segment to define said composite strip; and a resilient underlisting sleeve about which the strip composite is spirally wrapped and adhered.

8. A slip-on golf club grip as set forth in claim 7, wherein heat compressed radially inwardly extending reinforcement side edges are formed in the polyurethane layer of the segments along the length of the segments, and outwardly and downwardly slanted side edges are formed along the length of the backing layer of the segments whereby when the strip is spirally wrapped about the sleeve to define said grip the underside of the adjoining recessed side edges are overlapped by the slanted side edges to define a water retarding joint between the adjoining side edges.

9. A slip-on golf club grip as set forth in claim 8, wherein the backing layer is of felt.

10. A slip-on golf club grip as set forth in claim 8, wherein the backing layer includes an EVA.

11. A slip-on golf club grip as set forth in claim 8, wherein the friction enhancing pattern includes a large number of repetitive shapes which define the water collection interstices.

12. A slip-on golf club grip as set forth in claim 8, wherein the adhesive of the backing layer of the first segment is initially covered by a peel-off tape that is scored along one side to define a band that covers a skived side edge of said backing layer, said band being removed for attachment to a recessed reinforcement side edge of the second segment.

13. The combination of a golf club having a handle and a resilient grip wherein the resilient grip comprises:

a first segment having a backing layer to the upper surface of which is bonded a layer of polyurethane, with the upper surface of the polyurethane being heat-embossed with a friction enhancing pattern engaged by a player's hands, the friction enhancing pattern defining water collection interstices, with water collected in the interstices being readily wiped off to dry the outside of the strip, the upper surface of the polyurethane layer being densified and rendered substantially water-tight by the heat embossing;

a second segment having a backing layer of felt to the upper surface of which is bonded a coating of polyurethane and with depressed decorative indicia being embossed on the upper area of such second segment to densify the polyurethane layer thereof;

with a side edge of one segment being attached adhesively along its side edge to a side edge of the other segment to define said strip;

a resilient underlisting sleeve about which the composite strip is spirally wrapped and adhered; and with the sleeve being positioned upon the handle of the golf club.

14. The combination as set forth in claim 13, wherein heat compressed radially inwardly extending reinforcement side edges are formed in the polyurethane layer of the segments along the length of the segments, and outwardly and downwardly slanted side edges are formed along the length of the backing layer of the segments whereby when the strip is spirally wrapped about the sleeve to define said grip the underside of the adjoining recessed side edges are overlapped by the slanted side edges to define a water retarding joint between the adjoining side edges.

* * * * *

UNITED STATES PATENT AND TRADEMARK OFFICE
CERTIFICATE OF CORRECTION

PATENT NO. : 6,840,871 B2  Page 1 of 1
APPLICATION NO. : 10/695523
DATED : January 11, 2005
INVENTOR(S) : Ben Huang It is certified that error appears in the above-identified patent and that said Letters Patent is hereby corrected as shown below:

On Title Page, Item (76) please delete "La." And insert -- Lane --, therefore.

At column 6, line 64, in claim 1, please delete "paving" and insert -- having --, therefore.

At column 7, line 2, in claim 1, after "collected in the" please delete "in the".

At column 7, line 7, in claim 1, please delete "paving" and insert -- having --, therefore.

Signed and Sealed this

Ninth Day of January, 2007

JON W. DUDAS
*Director of the United States Patent and Trademark Office*